Feb. 28, 1933.  A. S. CAMERON  1,899,135
OPTICAL INSTRUMENT
Filed Jan. 27, 1930   3 Sheets-Sheet 1

INVENTOR.
Alexander S. Cameron
BY
ATTORNEY.

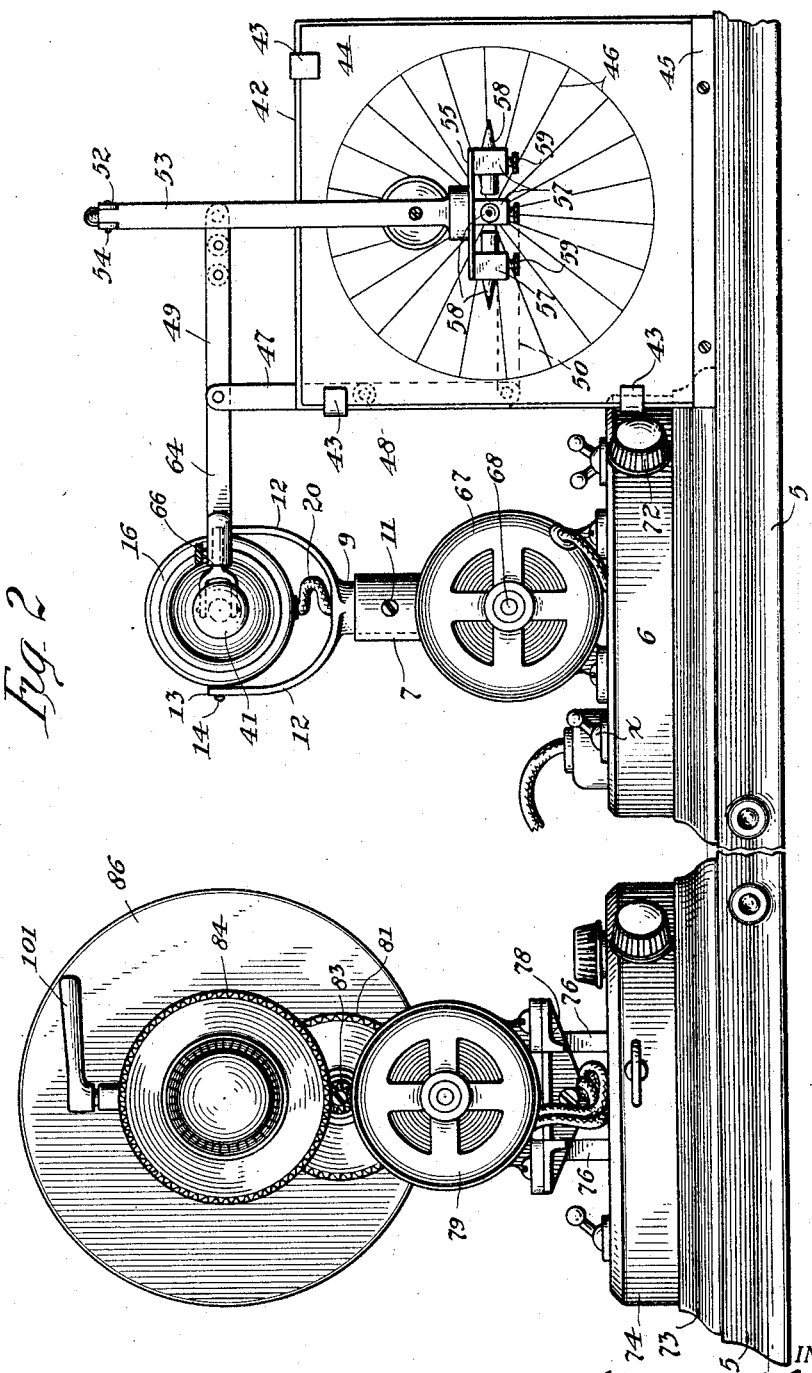

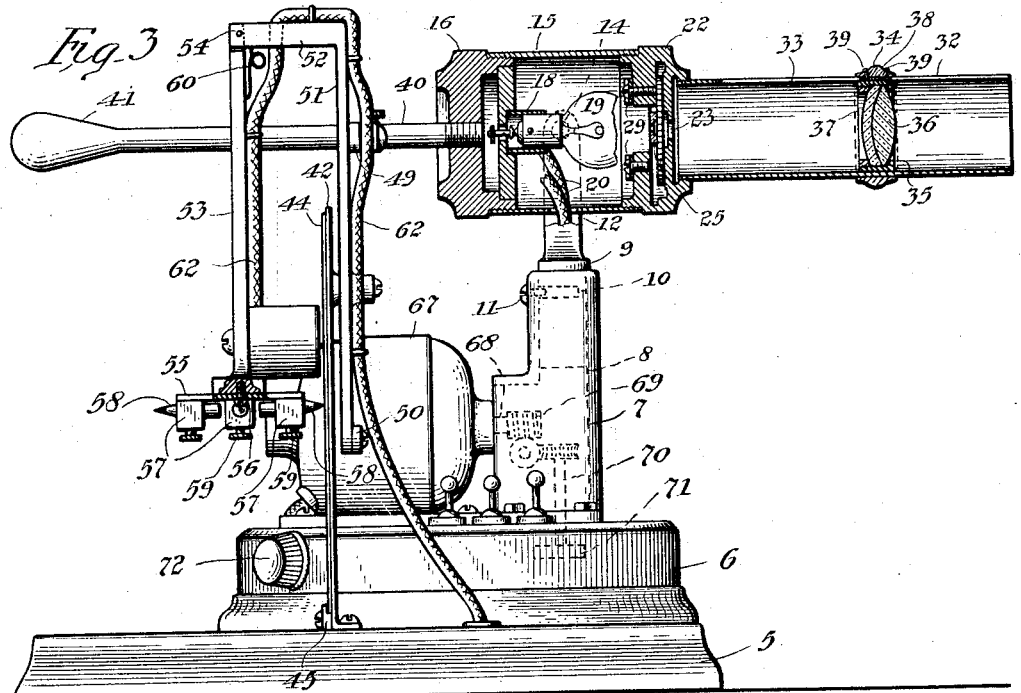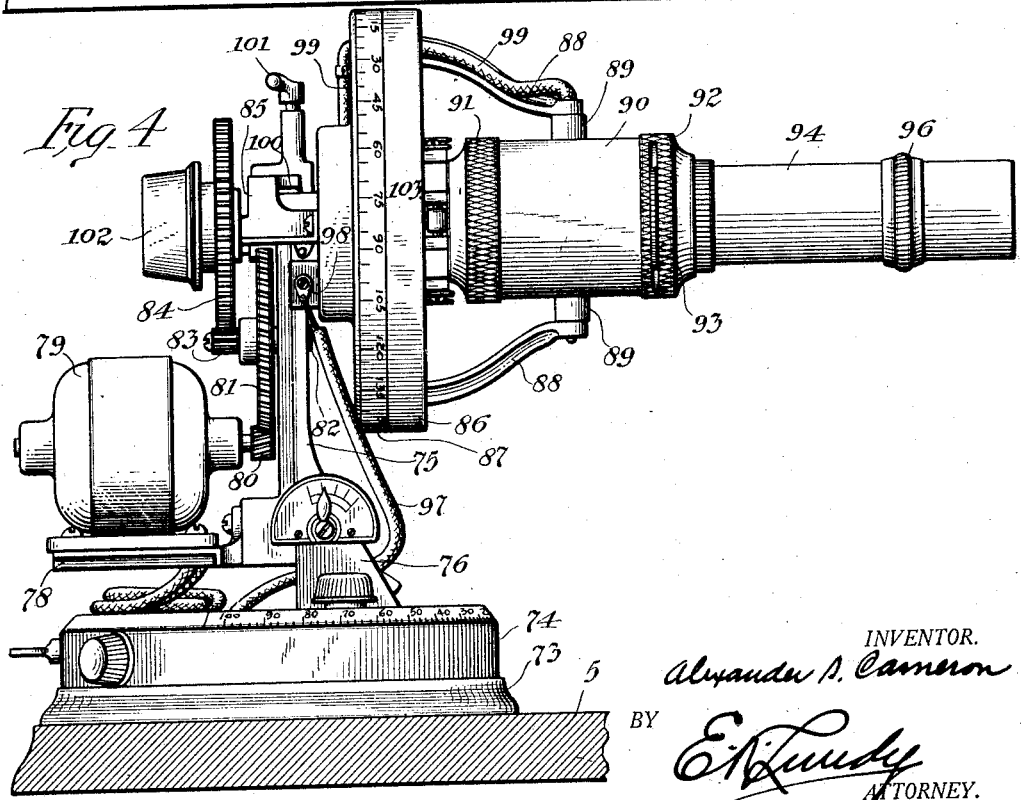

Patented Feb. 28, 1933

1,899,135

UNITED STATES PATENT OFFICE

ALEXANDER S. CAMERON, OF CHICAGO, ILLINOIS, ASSIGNOR TO WILLIAM J. CAMERON, OF CHICAGO, ILLINOIS

OPTICAL INSTRUMENT

Application filed January 27, 1930. Serial No. 423,612.

This invention relates to an optical apparatus and, primarily, the structure is designed for the purpose of exercising the eyes of the patient, as well as for measuring and charting the visual and color fields. In an application filed by me even date herewith, Serial No. 423,613, for an "optical instrument" (patented March 17, 1931 No. 1,796,359) I have disclosed a projector that throws an image upon a screen and by manually moving the projector to different locations measurements of the optical fields of a patient may be determined. In said companion applications are disclosed means for causing the light within the projector to be intermittently flashed thereby causing the image to be alternately displayed upon the screen. The image, by manually moving the projector may be flashed in different positions. An instrument of similar character is disclosed in connection with my present structure, and coacting or co-ordinating therewith is a mechanically operated projector which will cause another or a separate image to be automatically moved in straight paths or in circular orbits relative to an image that may be projected in a period of rest or inactive upon the same screen.

By means of this structure the image projected by the hand operated apparatus or projector may be used as the "fixation point" which may be adjusted or moved to different positions upon the screen wherever desired, and by setting the automatic projector in operation another image may be moved with respect to the first or stationary image, thus causing the patient to exercise the eye or eyes with beneficial results.

Furthermore, I provide complementary colored scopes through which the patient may observe the colored images upon the screen for the purpose of disassociation of the patient's eyes. By using these complementary colored glasses for the patient's eyes, and the projecting from the automatic projector a red spot for example, and from the manual instrument a similar or a different spot, and then require the patient to locate the fixation spot upon the screen, first without disassociation by means of the scope (and indicating the spot upon the chart), and then disassociating the eyes by means of the colored scopes, the operation may measure the chart the amount of heterophoria present with the particular patient and when the same is analyzed from the chart, by using different colored pencils, the operator may determine the type of phoria present in the patient.

Other features of this structure are the provision of a motor driven mechanical means for intermittently flashing the light by which the image and the test objects are projected upon the screen, and in connection with this type of mechanism there is also provided a simple manner of regulating the speed of the motor while the mechanism is in operation so that the length of the flashes and the periods between the flashes may be adjusted and controlled.

There are numerous objects in view in connection with this instrument, among which are the provision of an optical device that is novel in construction, dependable in operation, affective in performing its functions, simple and sturdy in the formation of its parts, and which will not readily get out of order. Other objects will be apparent to persons skilled in the art after an understanding of my invention is had; and I prefer to accomplish these objects and to practice my invention in substantially the manner hereinafter fully described and is more particularly pointed out in the claims. Reference is now made to the accompanying drawings that form a portion of this specification.

In the drawings:—

Figure 2 is a vertical elevation looking at the instrument from the ends of the projectors nearest the operator and patient but farthest from the screen.

Figure 3 is a vertical side elevation of the structure shown at the right side of Figures 1 and 2, the view being on the plane of lines 3—3 of Figure 1.

Figure 4 is a vertical side elevation of the portion of the instrument at the left side of Figures 1 and 2, the view being taken upon the plane of line 4—4 of Figure 1.

The drawings will be understood as being more or less schematic, and they illustrate a typical or preferred form in which my invention may be made; and in said drawings similar reference characters have been employed to designate like parts wherever they appear throughout the several views.

Figure 1:
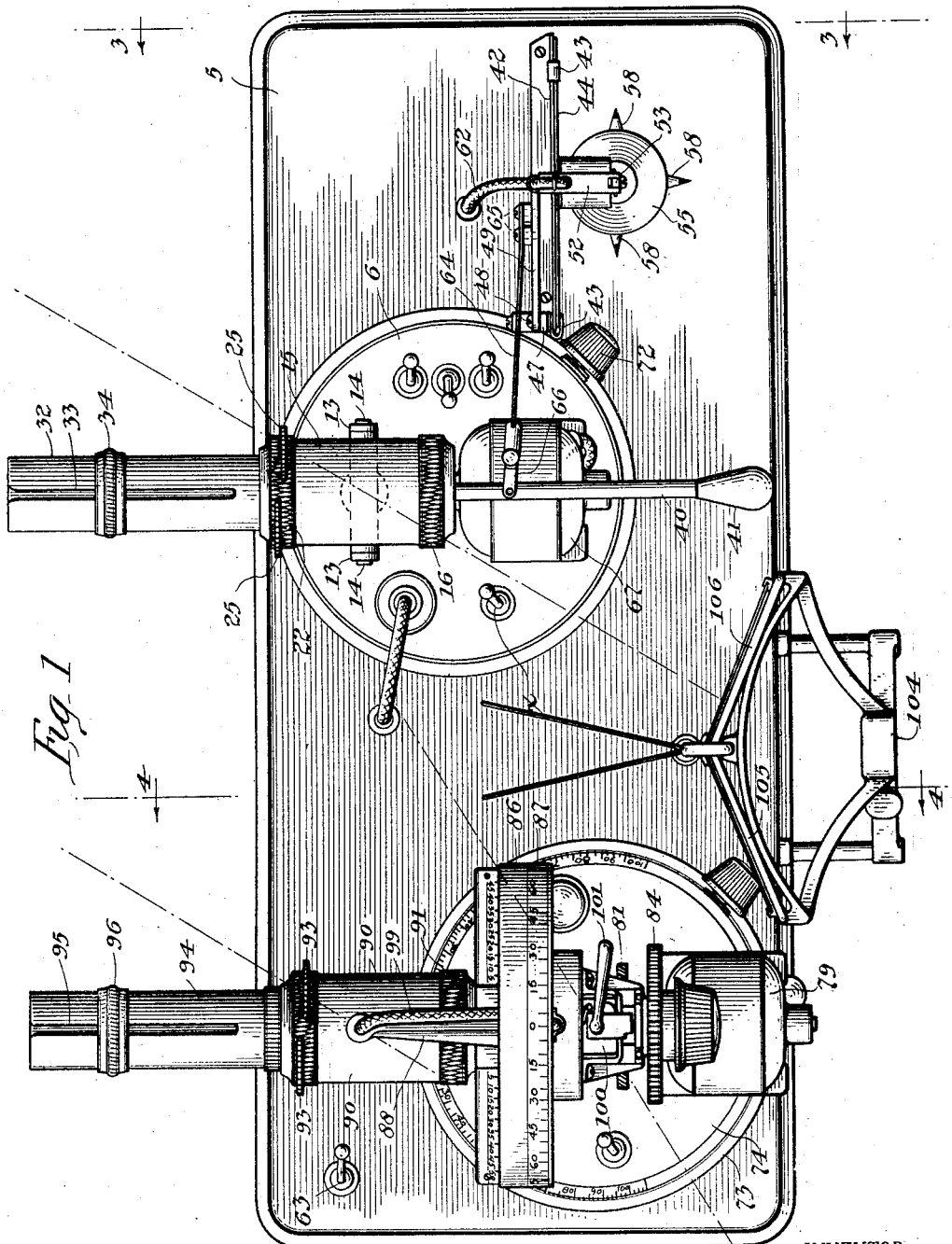
Figure 1 is a top plan of my improved optical instrument.

The instrument shown in the drawings consists of a rectangular flat plate 5 of sufficient dimensions to mount the automatically and the manually operated projectors and the charting and delineating devices. The manually operated projector includes a suitable base 6 that is circular in outline and is securely mounted upon the flat plate 5 and it has an irregularly shaped upright standard 7 thereon that is centrally bored to provide a socket 8 for an axially rotatable post 9. The lower portion of the post has a transverse groove or channel 10 to receive a guide screw or bolt 11 that screws into the socket wall to prevent accidental removal of the post from the socket but permit rotation thereof.

A pair of oppositely curved supporting arms 12 project upwardly from the post 9 and at their spaced upper ends are provided with alining facing bearings 13 to receive the trunnions 14 of the projector tube. This structure comprises a tubular lamp housing 15 from which trunnions 14 project, the rear of said housing being closed by a cap 16 screwed thereon and carrying an insulation disk 17 on which there is a socket 18 for an electric lamp or bulb 19. The conductors 20 enter the housing through the bottom of tube 15 and lead to the binding posts 21 upon the disk from which the usual electric connections are made with the socket and bulb.

The opposite end of the housing is closed by a cap 22 that has a central aperture 23 and upon diametrically opposite sides of the aperture there are bosses 24 for mounting rotatable shutters or screens 25 by means of shouldered screws 26.

Each shutter has a plurality of concentrically arranged apertures 27 and portions of the shutters extend through slots in end cap 22 so that they may be rotated to bring the apertures 27 of the respective shutters into alinement with each other and with the projection aperture 23.

The shutter apertures contain colored screens and images of different shapes so that images having different forms and colors may be projected upon the screen. At one side of the interior of cap 22 there is an embossment 28 on which a spring 29 is mounted intermediate its ends and transverse pins 30 on the ends of the spring engage notches in the faces of the shutters 25 to permit them to be rotated and maintained in adjusted positions.

Cap 22 has a threaded recess 31 into which the elongated projection tube 32 is screwed, and this tube has a longitudinal slot 33 that is open at the outer end to receive and permit longitudinal adjustment of a sliding lens unit.

This lens unit is of the condensor type and outer guide ring 34 that slides upon the tube 32 and carries a lens ring 35 in which is mounted the double-convex lens 36 and the concavo-convex lens 37. The lens ring 35 has an exterior diameter less than and is concentrically spaced away from the guide ring 34 far enough to permit said lens ring to enter and move within the projection tube 32, while guide ring 34 is placed on the outside of the tube. This spacing of the rings is done by interposing a spacer block 38 between the rings and connecting of the rings and block by screws 39, the block being small enough to slide in the slot 33 of the tube.

A hand rod 40 is screwed axially into the cap 16 at the rear of the projection tube and the said rod is provided upon its free end with a handle 41 by which it may be readily grasped by the operator for moving the projector to different positions.

Connected with the projector is a device for automatically charting and recording a patient's visual and color fields. This consists of an upright holder 42 on base plate 5 alongside the base 6. The plane of the holder 42 is at a right angle to the normal axis of the projection tube, that is, when the tube is pointing straight ahead at a right-angle to the screen, as depicted in Fig. 1. Spring clips 43 retain the chart or card 44 in grooved strip 45 at the bottom of the holder, and the face of the chart bears the usual optical diagram 46.

The means for marking a field upon the chart consists of a hinged parallelogram frame, one side rail 47 of which is pivoted intermediate its ends upon pin 48 projecting from the rear of the holder 42. At its upper and lower ends side rail 47 has pivotal or hinge connections with the adjacent ends of the top and bottom cross-bars 49 and 50 of the frame. A second side rail 51 is connected at its lower end to the bottom crossbar 50 and opposite the upper end of the anchored side rail the side rail 51 is pivoted to the top cross-bar 49. The side rail 51 extends above the top cross-bar 49 where it is formed with a lateral horizontal extension 52 that overhangs the chart holder 42 as shown in Figures 1 and 2.

A depending arm 53 is hinged on a pivot pin 54 at the end of extension 52 and hangs down across the face of the chart or card 44, and at its lower end the arm 53 carries a recording device. This device consists of a horizontal disk 55 movably connected by screw 56 to the lower enlarged end of the arm to permit its rotation. The underside of the disk has several lugs or bosses 57 that are bored radially with respect to the disk to receive pencils, crayons, or the like 58 that are secured in the bores by set-screws 59.

The pencils preferably contain differently colored leads and when in proper position the point of a pencil to be used is close to, but not touching, the chart or card. The arm 53 is held normally away from the chart or card by a spring 60 carried by the lateral extension, and when it is desired to mark a point upon the chart the arm is moved quickly towards the former so that the pencil point will impact the chart. In order to do this work automatically an electro-magnet 61 is placed on the back of arm 53 with its core close to the chart and holder. The holder being of metal, when the core is energized by the current through a conductor cable 62 it will be attracted to the holder with a rapid jerk and the pencil will mark the chart. After the position of the point has been determined by moving the projector, a snap-switch 63, interposed in the conductor, is moved and the electromagnet will be jerked to the holder causing the pencil 58 to mark a dot upon the chart.

The parallelogram frame is connected to the projection tube by a yieldable metal strip 64 connected at one end by the screws 65 to the top cross bar 49 and at its opposite end is connected a swivel device 66 to rod 40.

When rod 40 is moved and the image or test object is projected upon the screen in front of the projector, the pencil or delineating point will be correspondingly moved in respect to the chart, and, whenever the operator has ascertained a point in the boundary of an optical field of a patient, the switch 63 may be snapped and the ascertained point will be indicated upon the chart. When different color fields are being ascertained the disk is rotated so that a pencil of the corresponding color of the field is placed next the chart so that the points ascertained will not conflict with each other when the several fields are being marked upon the same.

Mechanically operated electrical means may be provided to intermittently supply the electric current to the bulb whenever it is desired to flash the image upon the screen. The mechanism is driven by a small electric motor 67, the spindle 68 of which carries a worm 69 inside the hollow lower portion of standard 7. A worm gear reduction structure (not shown) connects worm 69 to a vertical spindle 70 that passes through the top of base 6 and has a disk 71 secured to it that has a waved or notched edge against which a spring switch arm presses for opening and closing the circuit to the socket and lamp. The details of this mechanism are fully disclosed in my above-identified co-pending application, and have been omitted herein for brevity but to which reference is hereby made. The current to the motor 67 is controlled through a snap switch x on the base 6.

The speed with which the motor is moved is regulated by a controller within the base 6 and which is manipulated by a hand wheel or button 72 that is positioned upon the exterior of the base 6.

When the motor circuit is turned on the motor rotates the disk 71 by the worms and gears and then the controller button may be rotated in either direction to increase or decrease the motor speed which correspondingly increases or decreases the speed of the disk and consequently regulates the time between, as well as the length of, the flashes of the image projected upon the screen by the bulb and projector tube.

With the portion of the instrument hereinbefore described it is possible to throw upon the screen an image that remains stationary and which, if desired may be flashed on and off by using the mechanical switching devices described. When a "fixation point" is desired, the image is positioned upon the screen directly in front of the patient and thereafter the portion of the instrument alongside of the structure heretofore described is operated for the purpose of moving another image with respect to the image that provides the "fixation point". The structure which I have employed for displaying and moving this second image is constructed along the principles of the device disclosed in a copending application filed by me January 18, 1928, Serial No. 247,724 for an "Instrument for examining, testing, and exercising the eyes" and which is known commercially and to the optical profession as the Myoculator. Reference is herein made to the said copending application and the particular structure disclosed therein for more specific details in construction and arrangements of parts, which, for the sake of brevity are omitted in the present disclosure.

The portion of the instrument which will now be described is shown as positioned upon the base plate 5 alongside of and to the left of the structure which has been previously described and consists of a base 73 secured to the plate 5 and upon which a turret plate 74 is mounted, the assembly of these members being such that the turret 74 may be rotated in a horizontal plane and thus bodily all of the parts of the structure that are mounted on said turret. The standard 75 is hingedly and frictionally mounted between upstanding lugs or feet 76 arising from the top of turret 74 and just above the latter the standard is provided with a shelf or platform 78 upon which a small electric motor 79 is secured. The spindle of the motor carries a worm pinion 80 that is in mesh with a large worm wheel 81 mounted upon the short horizontal shaft 82 that projects laterally from the standard, and the hub of the worm wheel is formed into a pinion 83 that meshes with a large gear 84 upon the adjacent portion of the horizontally disposed main operating shaft 85 of the projecting apparatus that has bearings in the upper portion of the standard 75.

The shaft 85 is hollow or of the sleeve type, and upon its end opposite the gear has a head 86 mounted on it and rotatable therewith. This head is a large flanged disk, upon the rim of which there is a scale 87 indicating the degrees of a circle. Frictional connections or a clutch between the head and shaft permit the former to be rotated or moved independently of the automatic drive mechanism. Bracket arms 88 extend outwardly away from the head, upon the side thereof farthest from the gear 84, and the outer ends of said arms formed into bearings to receive the trunnions 89 of the mechanical and automatically actuated projector.

This projector is practically identical with the projector heretofore described in connection with the other portion of the apparatus and comprises, briefly, the tubular lamp housing 90 with its rear end closed by the cap 91 upon which the lamp socket and lamp are supported, while its opposite end is closed by an apertured cap 92 in which the rotatable shutters or screens 93 are mounted. The projection tube 94 is secured into the cap 92 and is provided with a longitudinal slot 95 for guiding the condensing lens unit 96 that may be adjusted back and forth on the tube.

The current is led from any suitable source through conductor cable 97 to a terminal 98 upon a distributor device mounted upon the standard 75 between the gear 84 and the head 86, said distributor having means, in the form of concentric contacts, to transmit the current to the socket through the conductors 99 while the head may be rotating. This current conductor leads from the concentric distributors through the head, along one of the arms 88 and through the adjacent trunnion 89 of the lamp housing which has been bored to receive the same. The conductors of the distributor device permit the illumination of the lamp whether the head is rotating or is stationary, and the fricton or clutch connection between the head and the shaft permit the head and the projector to be rotated independently of the motor driven mechanism. For the purpose of securing a definite coaction between the shaft 85 and the head, a clutch mechanism 100 may be employed which mechanism is controlled by a handle or lever 101. As heretofore stated, the projection tube or projector is adapted to be moved in a definite path so that the image thrown on the screen will be moved in a predetermined manner with respect to the other image thrown by the other projector.

In order to accomplish this the head is provided with a suitable adjustable spider that may be adjusted by the cam mechanism by means of a hand wheel 102 that is mounted upon the outer end of the spindle that actuates the cam mechanism. The spider may thus be moved from the central or axial center of the disk forming the body of the head 86 toward the rim thereof and when moved in this manner the spider, which is connected to a stud 103 carried by the cap 91 of the projector, will move the latter upon its trunnions 89 so that said projector is oscillated. For example, should it be desired to move the image in an orbit or circular path, the hand wheel 102 is turned until the projector has been tilted to the proper angle to describe a circle of the required diameter. The clutch mechanism is then thrown in and the motor, through the gears and the main shaft, will rotate the head, and, as the projector has been set oblique to the axis of rotation of the head, it will describe the circle and the image upon the screen will traverse a path in a circle upon the screen. By manipulating the spider and the clutch the head may be caused to remain stationary and the projector will oscillate in a plane at any meridian within the 180° of a circle. This will cause the image to travel in a path to and from the "fixation point" upon the screen and at the proper angle which has been predetermined by the operator.

Intermediate the plane of the projectors heretofore described I mount, upon the base 5, a standard or bracket 104 in the upper arms of which there is placed the pair transparent glass plates 105 and 106, preferably disposed oblique to each other and which are made from glass of complementary colors. These plates act as scopes so that a patient viewing the images upon the screen which are in complementary colors may disassociate these images by observing them through the scopes.

From the foregoing it will be seen that I have provided an instrument wherein the eyes may be tested, and the optical and color fields may be readily measured and charted. In addition thereto the instrument is capable of use in the treatment of defects of vision or tendencies of the eyes to deviate from their natural positions. The structures which have been herein disclosed are capable of modification, and it will be understood that such changes may be made without departing from the principles involved. The drawings and description herein given are for the purpose of clearness and understanding only, and no unnecessary limitations are to be understood therefrom, but the claims are to be construed as broadly as permissible in view of the prior art.

What I claim is:—

1. An instrument for exercising the eyes of a patient comprising two independent projectors arranged adjacent each other for simultaneously projecting separate colored images upon a screen to be viewed by the patient through disassociating elements, and mounting means for the respective projectors whereby they are capable of universal movement independent of each other to move either image to any position upon the screen, one of the images thus projected providing a fixation point with respect to which the other image may be moved.

2. An instrument for exercising the eyes of a patient comprising a manually adjustable projector for projecting a fixed image in any position upon a screen to provide a fixation point for the patient, a second projector adjacent the first projector for simultaneously projecting a second image upon the screen, means on the projectors for displaying the respective images in complementary colors, motor-driven devices for moving the second projector to cause the second image to move in various predetermined paths with respect to the fixation point, and scopes of complementary colors through which the fixed and moving images are viewed in disassociation by the patient.

3. An instrument for exercising the eyes of a patient comprising a projector for displaying a fixed image in any position upon a screen to provide a fixation point, an automatically movable projector for simultaneously projecting a second image upon the screen that is moved in various definite paths with respect to the first image, means for displaying the respective images in complementary colors, and scopes of complementary colors through which the images are viewed in disassociation by the patient.

4. An instrument for exercising the eyes of a patient comprising means for displaying a relatively fixed image in any position upon a screen, independent devices for simultaneously projecting a second image that is automatically movable to various positions upon the screen at or adjacent with the first image, and means cooperable with said means and devices for causing disassociating the images when the same are viewed by the patient.

5. An instrument for exercising the eyes of a patient comprising devices for simultaneously projecting a relatively stationary image and a movable image upon a screen, the stationary image providing a fixation point on the screen, means on said devices for displaying the respective images in complementary colors, and translucent plates adjacent said devices through which said images are viewed by the patient in disassociation.

6. An instrument for exercising the eyes of a patient comprising a projector adapted to display an image upon a screen, means for mounting said projector for universal manual adjustment, a second projector for simultaneously displaying a second image upon the screen adjacent the first image, means for mounting the second projector for universal movement, motor-actuated devices for automatically moving the second projector to cause the second image to traverse definite paths upon the screen with respect to the first image, and complementary colored screens through which the images are viewed by the patient in disassociation.

7. An instrument for exercising the eyes of a patient comprising a projector adapted to display an image upon a screen, means for mounting said projector for universal manual adjustment, a second projector for simultaneously displaying a second image upon the screen, said images being displayed in complementary colors, means for mounting the second projector for universal movement, motor-actuated devices for automatically moving the second projector to cause the second image to traverse various definite paths upon the screen with respect to the first image, and means for causing disassociation of the images when viewed by the patient.

8. An instrument for exercising the eyes of a patient comprising a projector adapted to display an image upon a screen, means for mounting said projector for universal manual adjustment, a second projector for simultaneously displaying a second image upon the screen, colored light filters coacting with said projectors for displaying the images in complementary colors, means for mounting the second projector for universal movement, motor-actuated devices for automatically moving the second projector to cause the second image to traverse various definite paths upon the screen with respect to the first image, and means for causing disassociation of the images when viewed by the patient.

9. An instrument for exercising the eyes of a patient comprising a projector adapted to display an image upon a screen, means for mounting said projector for universal manual adjustment, a second projector for simultaneously displaying a second image upon the screen, colored light filters coacting with said projectors for displaying the images in complementary colors, means for mounting the second projector for universal movement, motor-actuated devices for automatically moving the second projector to cause the second image to traverse various definite paths upon the screen with respect to the first image, and scopes of complementary colors adjacent said projectors for disassociating the images viewed by the patient.

10. An instrument for exercising the eyes of a patient comprising means for displaying a fixation image upon a screen in front of the patient, a projector for projecting a separate image simultaneously upon the screen, means for displaying said images in complementary colors, and complementary colored scopes through which the patient views the images on the screen, said projector being mounted for universal movement to change the image projected thereby, whereby the images may be displayed in superposed relation and one of the images moved away from the other image while viewed by the patient in disassociation through said scopes.

Signed at Chicago, in the county of Cook, and State of Illinois, this 20th day of December, 1929.

ALEXANDER S. CAMERON.